(12) United States Patent
Sareday et al.

(10) Patent No.: US 7,853,608 B2
(45) Date of Patent: Dec. 14, 2010

(54) E-LEARNING AUTHORSHIP BASED ON META-TAGGED MEDIA SPECIFIC LEARNING OBJECTS

(75) Inventors: Seshkuumar Sareday, San Jose, CA (US); Supra Manohar, San Jose, CA (US); Sriram Somanchi, Fremont, CA (US); Vijay Ananth, Chennai (IN)

(73) Assignee: Emantras, Inc, Fremont, CA (US)

( * ) Notice: Subject to any disclaimer, the term of this patent is extended or adjusted under 35 U.S.C. 154(b) by 310 days.

(21) Appl. No.: 11/702,710

(22) Filed: Feb. 5, 2007

(65) Prior Publication Data

US 2008/0189684 A1 Aug. 7, 2008

(51) Int. Cl.
G06F 17/30 (2006.01)

(52) U.S. Cl. ..................................... 707/769
(58) Field of Classification Search ............... 707/104.1
See application file for complete search history.

(56) References Cited

U.S. PATENT DOCUMENTS

| | | | |
|---|---|---|---|
| 6,910,049 B2 | 6/2005 | Fenton et al. | |
| 7,467,947 B2* | 12/2008 | Sperle | 434/322 |
| 2002/0194194 A1 | 12/2002 | Fenton | |
| 2003/0009742 A1* | 1/2003 | Bass et al. | 717/104 |
| 2004/0148313 A1* | 7/2004 | Lu et al. | 707/104.1 |
| 2005/0287509 A1* | 12/2005 | Mohler | 434/350 |
| 2006/0134593 A1* | 6/2006 | Kalous et al. | 434/350 |
| 2006/0136974 A1 | 6/2006 | Lee et al. | |
| 2007/0031807 A1* | 2/2007 | Kim | 434/350 |
| 2007/0067287 A1 | 3/2007 | Erhard et al. | |
| 2007/0073663 A1 | 3/2007 | McVeigh et al. | |
| 2007/0099161 A1* | 5/2007 | Krebs et al. | 434/322 |
| 2007/0100829 A1* | 5/2007 | Allen et al. | 707/9 |
| 2007/0100882 A1* | 5/2007 | Hochwarth et al. | 707/104.1 |

FOREIGN PATENT DOCUMENTS

WO WO-02103548 A1 12/2002
WO WO-2007015100 A1 2/2007

* cited by examiner

Primary Examiner—Neveen Abel Jalil
Assistant Examiner—Kevin Young
(74) Attorney, Agent, or Firm—Raj Abhyanker, P.C.

(57) ABSTRACT

A method and system of an e-learning authorship based on meta-tagged media specific learning objects are disclosed. In one embodiment, a method includes searching for learning objects in a repository based on a content query data publishing the learning objects to a content management system through applying a meta-data describing a context to the learning objects to such that the learning objects become readily accessible based on a search of the context and generating a set of executable files based on the learning objects and a number of auxiliary files associated with the set of executable files to create an e-learning course of a specific media type. In addition, the method may include comparing a context query data and the meta-data of the each of the learning objects to perform a context search which is used to select a subset of the learning object matching the context query data.

1 Claim, 11 Drawing Sheets

E-LEARNING AUTHORSHIP BASED ON META-TAGGED MEDIA SPECIFIC LEARNING OBJECTS

FIELD OF TECHNOLOGY

This disclosure relates generally to the technical fields of software and/or hardware technology and, in one example embodiment, to a method and system of an e-learning authorship based on meta-tagged media specific learning objects.

BACKGROUND

A non-digital learning object (e.g., an entity that may be used and/or reused for learning) may be converted into a digital learning object in a native form (e.g., a DocBook format, a native XML, etc.). The digital learning object may be assigned with a meta-data which describes a content of the learning object. Encrypting the meta-data may require a lot of repetitive manual labor. In addition, the meta-data may be encrypted by a person (e.g., a programmer, a data entry clerk, etc.) who may not have a definitive idea as to how the learning object may be used.

An authoring station (e.g., a workstation, a computer, a portable computing device, etc.) of an e-learning system (e.g., made up of a learning management system, a content management system, an administrative management system, etc.) may be used to create (e.g., and/or access, edit, interpret, and/or present) an e-learning course (e.g., based on one or more units of the learning object). The authoring station may include a number of software programs (e.g., a course editor, a browser, etc.) to prepare the e-learning course.

The authoring station may search for the learning object based on the meta-data of the learning object. Thus, an incorrectly entered meta-data may hinder the authoring station to locate the learning object. As such, the learning object may not be easily reusable to create the e-learning course, thus resulting in an economic and/or intellectual waste (e.g., of not utilizing the learning objects as an educational resource).

The e-learning course may be published to the content management system and/or distributed to a user of the e-learning couse using the learning management system. The user may interact with the e-learning course through a learning portal (e.g., on a webpage of a company, a school, etc.). The learning portal may be stationary, thus preventing the user from accessing the e-learning course when the user is on a move. Furthermore, the e-learning course published on the content management system may not be easily adaptable for a particular media type because learning objects that make up the e-learning course may not be conditioned to execute in the particular media type.

SUMMARY

A method and system of an e-learning authorship based on meta-tagged media specific learning objects are disclosed. In one aspect, the method includes searching (e.g., a search based on the content-data may be performed using a search engine processing and interpreting the learning objects in a markup language format) for a learning objects (e.g., the learning object(s) 404 of FIG. 4) in a repository based on a content query data and publishing the learning objects (e.g., which may be based on a shareable courseware object reference model (SCORM) which may enable a plug-and-play interoperability, an accessibility, and a reusability of a web-based content) to a content management system through applying a meta-data (e.g., which may include an attribute of the learning objects, a node of the objects, and a node value of the learning objects) describing a context to each of the learning objects such that the learning objects become readily accessible based on a search of the context.

The method also include generating a set of executable files based on the learning objects and a number of auxiliary files (e.g., the auxiliary files may include a flash file, an image file, and/or a media file) associated with the set of executable files to create an e-learning course of a media type.

In addition, the method may also include comparing a query data and a content-data of the learning objects to select among the learning objects. The method may further include comparing the context query data and the meta-data of the learning objects to perform a context search that may be used to select a subset of the learning object matching the context query data.

Also, the method may include encrypting the set of executable files (e.g., executable file 414 of FIG. 4 and/or the executable file 608 of FIG. 6), a number of flash files (e.g., the flash file 416 of FIG. 4 and/or the flash file 612 of FIG. 6) and/or image files (e.g., image files 418 of FIG. 4 and/or the image files 610 of FIG. 6) to prevent an unauthorized user accessing the e-learning course. Moreover, the method may include presenting a preview of the e-learning course through executing the set of executable files and/or the number of auxiliary files according to one navigation path of the e-learning course (e.g., the navigation path may sequentially present the learning objects of the e-learning course according to the SCORM).

Furthermore, the method may include directly communicating the e-learning course to the media type (e.g., the media type may include a computer, a personal digital assistant, a mobile phone, and/or an iPod®) bypassing the content-management system. Similarly, the method may include initiating the e-learning course through communicating one descriptive data (e.g., the descriptive data may include a title of the e-learning course, an author of the e-learning course, a description of the e-learning course, a credit of the e-learning course, a prerequisite of the e-learning course, and/or a competency of the e-learning course) of the e-learning course to an administration management system.

In another aspect, a method includes generating a set of executable files based on a learning objects and/or a number of auxiliary files associated with the set of executable files to create an e-learning course of a mobile device (e.g., the mobile device 126 of FIG. 1) and communicating the e-learning course to a content management system which interfaces with the mobile device executing the e-learning course.

The method may also include initiating the e-learning course through communicating one descriptive data (e.g., the descriptive data may contain a title of the e-learning course, an author of the e-learning course, a description of the e-learning course, a credit of the e-learning course, a prerequisite of the e-learning course, and/or a competency of the e-learning course) of the e-learning course to an administration management system.

The method may further include generating one assessment file (e.g., an assessment file may be a part of the set of executable files of the e-learning course). Moreover, the method may include performing a selectively streaming the set of executable files and/or the number of auxiliary files and/or selectively downloading the set of executable files and/or the number of auxiliary files when communicating the e-learning course to the mobile device.

In yet another aspect, a system includes a tagging module (e.g., the tagging module 106 of FIG. 1) to assign a meta-data (e.g., the meta-data may be assigned based on a shareable courseware object reference model (SCORM) standard) to a learning objects with the meta-data describing a context of the learning objects, an executable module (e.g., the executable module 108 of FIG. 1) to generate a set of executable files associated with an electronic device having the learning objects and a course creation module (e.g., the course creation module 104 of FIG. 1) to generate an e-learning course according to a media type of the electronic device based on the set of executable files and other types of files.

The system may also include an auxiliary creation module (e.g., the auxiliary creation module 206 of FIG. 2) to create a number of auxiliary files (e.g., the auxiliary files may contain a flash file, an image file, and/or a media file) associated with the set of executable files to support the executable files based on the learning objects with an animation, an image, and/or other media type.

The system may further include a path creation module (e.g., the path creation module 208 of FIG. 2) to determine sequences to present any portion of the set of executable files and/or the number of auxiliary files according to a SCORM standard. Moreover, the system may include a course review module to create a run-time environment of the e-learning course according to the SCORM standard when communicating the e-learning course to a content management module (e.g., the content management module 114 of FIG. 1) and/or a particular media type.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

The methods, systems, and devices disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Figure 1:
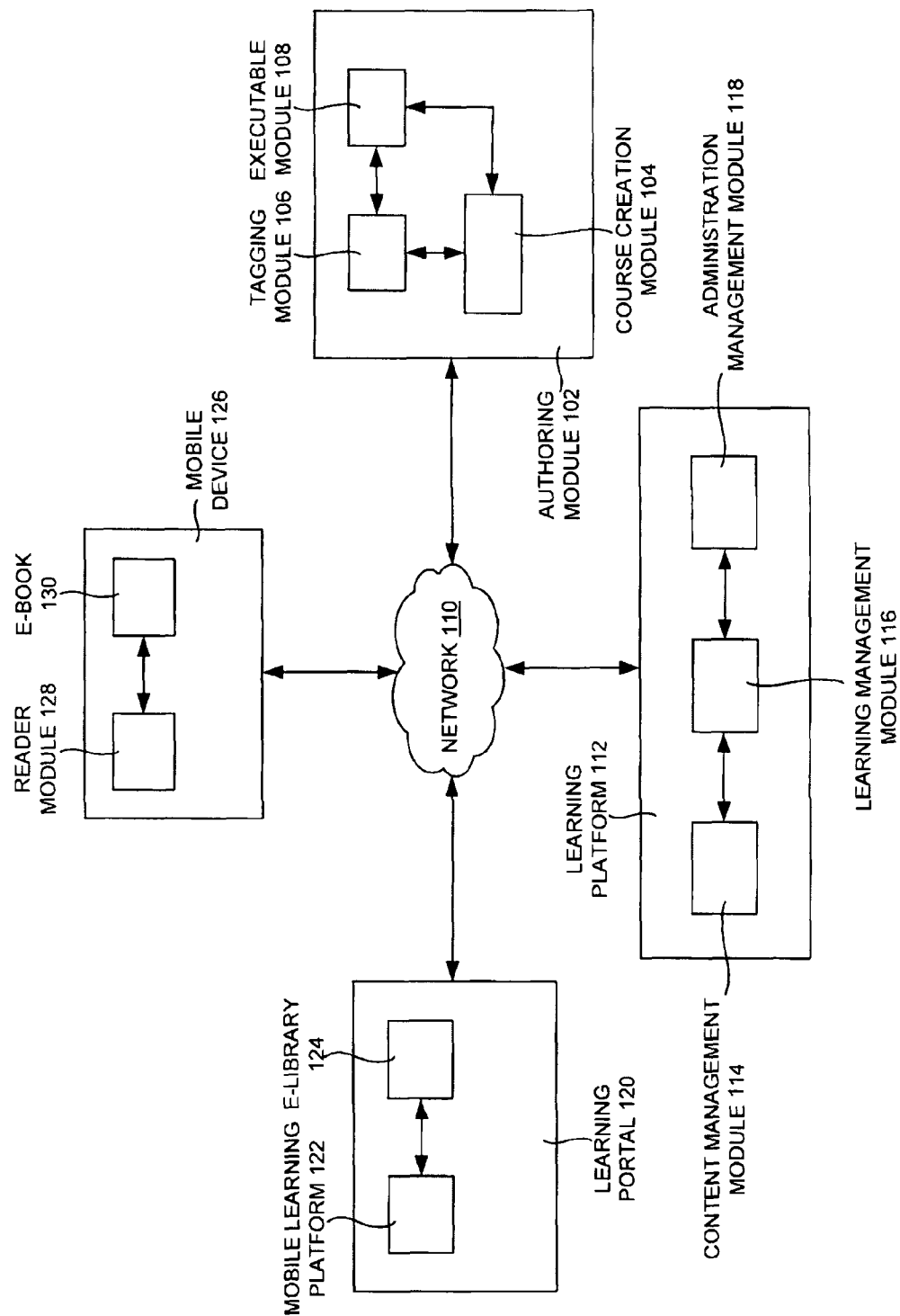
FIG. 1 is a system view of an authoring module communicating with a learning platform, a learning portal and a mobile device through a network (e.g., the network 110 of FIG. 1), according to one embodiment.

Other features of the present embodiments will be apparent from the accompanying drawings and from the detailed description that follows.

DETAILED DESCRIPTION

A method and system of an e-learning authorship based on meta-tagged media specific learning objects are disclosed. In the following description, for purposes of explanation, numerous specific details are set forth in order to provide a thorough understanding of the various embodiments. It will be evident, however, to one skilled in the art that the various embodiments may be practiced without these specific details.

In one embodiment, a method includes searching for a learning objects in a repository based on a content query data, publishing the learning objects to a content management system through applying a meta-data describing a context to each of the learning objects such that the learning objects become readily accessible based on a search of the context and generating a set of executable files (e.g., the executable file 414 of FIG. 4 and/or the executable file 608 of FIG. 6) based on the learning objects and a number of auxiliary files associated with the executable files to create an e-learning course of a specific media type.

In another embodiment, a method includes generating an executable files based on learning objects and a number of auxiliary files associated with the executable files to create an e-learning course of a mobile device (e.g., the mobile device 126 of FIG. 1) and communicating the e-learning course to a content management system which interfaces with the mobile device (e.g., the mobile device 126 of FIG. 1) executing the e-learning course.

In yet another embodiment, a system includes a tagging module to assign a meta-data to each of a learning objects with the meta-data describing a context of the each of the learning objects, an executable module (e.g., the executable module 108 of FIG. 1) to generate an executable files associated with an electronic device having the learning objects and a course creation module (e.g., the course creation module 104 of FIG. 1) to generate an e-learning course according to a media type of the electronic device based on the executable files and other types of files.

FIG. 1 is a system view of an authoring module 102 communicating with a learning platform 112, a learning portal 120 and a mobile device 126 through a network 110, according to one embodiment. Particularly, FIG. 1 illustrates the authoring module 102, a course creation module 104, a tagging module 106, an executable module 108, the network 110, the learning platform 112, a content management module 114, a learning management module 116, an administration module 118, the learning portal 120, a mobile learning platform 122, an e-library 124, the mobile device 126, a reader module 128 and an e-book 130 according to one embodiment.

The authoring module 102 may generate executable files and auxiliary files adapting to a specific media type to create of an e-learning course (e.g., for the mobile device 126). The course creation module 104 may create the e-learning course which may be based on a set of the executable files and/or other types of files. The tagging module 106 may attach one or more meta-data to learning objects to describe a context of the learning objects.

The executable module 108 may generate the set of executable files associated with a device used to conduct the e-learning course. The network 110 may transfer a data between different modules in a communication system. The learning platform 112 may deliver and/or support learning and/or by organizing mapping and/or delivering curriculum activity. The content management module 114 may be used to configure, manage, schedule pages, upload and/or send information to a targeted device. The learning management module 116 may manage and/or track activities and/or tasks associated with the e-learning courses.

The administration management module 118 may share a common training management database and/or maintain a permanent historical training record of a user. The mobile learning platform 122 may be used to interface with the mobile device (e.g., the mobile device 126 of FIG. 1) to directly download an application program, the executable files and/or the auxiliary files to the mobile device.

The e-library 124 may contain a number of the executable files and the auxiliary files that may be available in machine readable format. The mobile device 126 may be a handheld computing device (e.g., a cellphone, an iPod®, a PDA, etc.), that may contain the e-book (e.g., the e-book 130) and/or an application program (e.g., the reader module 128) to access the e-book (e.g., the e-book 130). The reader module 128 of the application program may process the e-book containing the executable file and/or the auxiliary files associated with the executable file. The e-book 130 may be in a digital format embedded in a hardware device to enable a user to access the e-learning course (e.g., while the user is traveling).

In example embodiment as illustrated in FIG. 1, the authoring module 102 may communicate with the learning platform 112, the learning portal 120 and the mobile device 126 through the network 110. The course creation module 104 may communicate with the tagging module 106 and the executable module 108 of the authoring module 102. The learning management module 116 of the learning platform 112 may communicate with the content management module 114 and the administration management module 118 of the learning platform 112. The mobile learning platform 122 may communicate with the e-library 124 of the learning portal 120. The reader module 128 may communicate with the e-book 130 of a mobile device 126.

In another example embodiment, the tagging module 106 may assign meta-data to learning objects. The meta-data may describe a context of the learning objects. The executable module 108 may generate executable files associated with an electronic device having the learning objects. The executable files may be generated based on the learning objects and/or a number of auxiliary files associated with the executable files to create the e-learning course catering to the electronic device.

Figure 2:
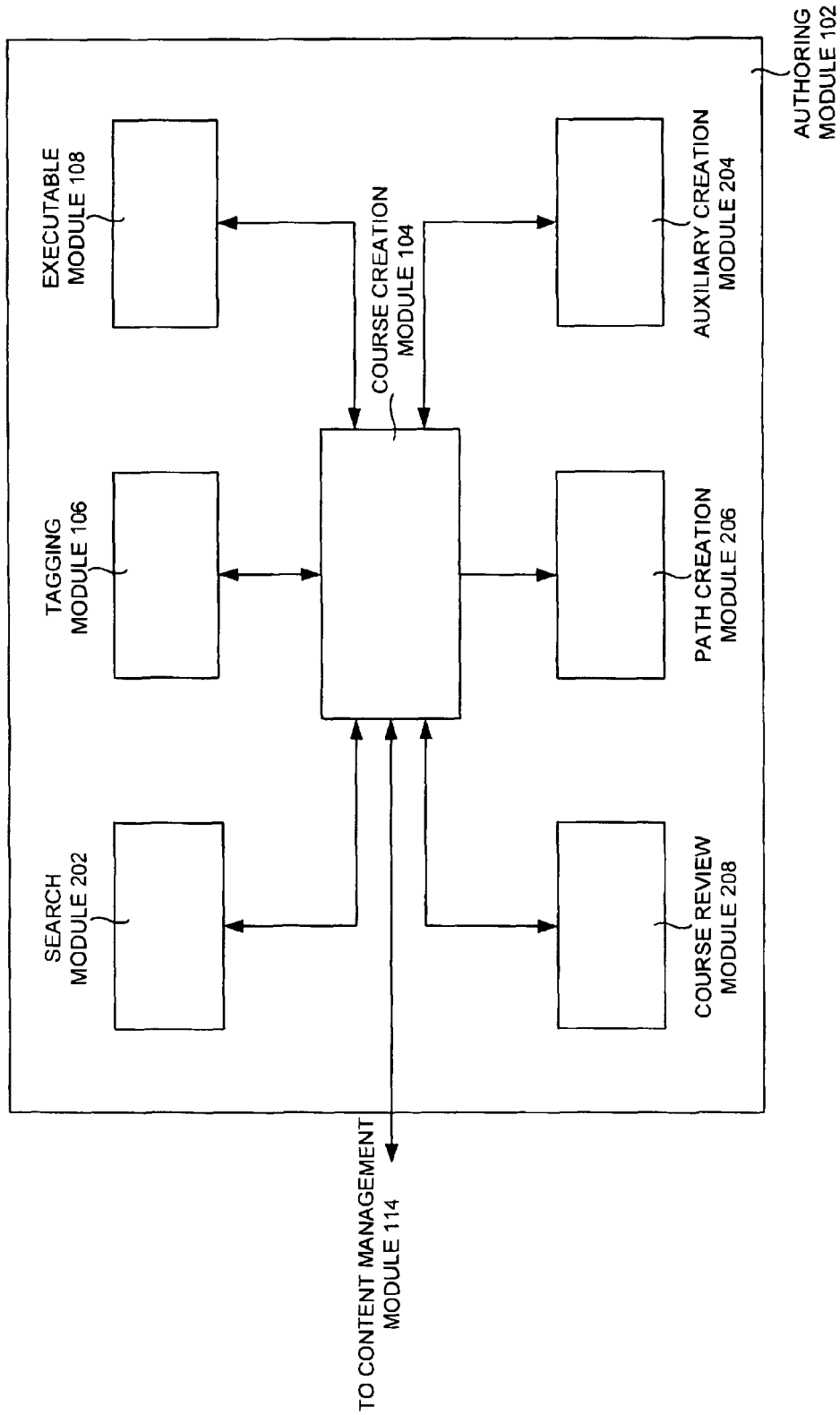
FIG. 2 is an exploded view of the authoring module of FIG. 1, according to one embodiment.

The course creation module 104 may generate the e-learning course according to a media type of the electronic device based on the executable files and/or other types of files. The e-learning course may be communicated to the content management system (e.g., the content management module 114) which interfaces with the mobile device 126 executing the e-learning course. Furthermore, the e-learning course may be initiated through communicating one descriptive data of the e-learning course to an administration management system (e.g., the administration management module 118), as the one descriptive data may include a title of the e-learning course, an author of the e-learning course, a description of the e-learning course, a credit of the e-learning course, a prerequisite of the e-learning course, and/or a competency of a user subscribing to the e-learning course FIG. 2 is an exploded view of the authoring module 102 of FIG. 1, according to one embodiment. Particularly, FIG. 2 illustrates the course creation module 104, the tagging module 106, the executable module 108, a search module 202, an auxiliary creation module 204, a path creation module 206 and a course preview module 208 according to one embodiment. The course creation module 104 may create the e-learning course according to a media type of an electronic device that may be based on the set of the executable files and/or other types of files.

The tagging module 106 may attach a meta-data to a learning object to describe a context of the learning object. The executable module 108 may generate executable files associated with the electronic device used to conduct the e-learning course. The search module 202 may be a search engine that may search for learning objects from a storage (e.g., a local and/or remote repository) based on a content query data and/or process and/or interpret the learning objects in a markup language format.

The auxiliary creation module 204 may create a number of auxiliary files (e.g., a flash file, an image file, a media file, etc.) associated with the executable files of the learning objects. The path creation module 206 may determine sequences to present any portion of the executable files and/or the number of auxiliary files (e.g., the flash file, the image file, the media file) in accordance with the SCORM standard. The course preview model 208 may provide a preliminary survey of the e-learning course by executing a set of executable files and/or the auxiliary files that may be in accordance with any of a navigation path of the e-learning course (e.g., which may be designed by an author of the course).

In example embodiment as illustrated in FIG. 2, the course creation module 104 of FIG. 1 of the authoring module 102 may communicate with the tagging module 106, the executable module 108, the search module 202, the auxiliary creation module 204, the path creation module 206 and/or the course preview module 208 of the authoring module 102. The course creation module 104 of the authoring module 102 may communicate with the content management module 114 of the learning platform 112.

In another example embodiment, the auxiliary creation module 204 may create auxiliary files associated with executable files to support the executable files based on learning objects with animations, images, and/or other media types. The auxiliary files may include flash files, image files, and/or other media files. The path creation module 206 may determine a sequence to present any portion of the executable files and/or the number of auxiliary files according to the SCORM standard. The course review module 208 may create the runtime environment of the e-learning course according to the SCORM standard when communicating the e-learning course to the content management module (e.g., the content management module 114 of FIG. 1) and/or a particular media type.

Figure 3:
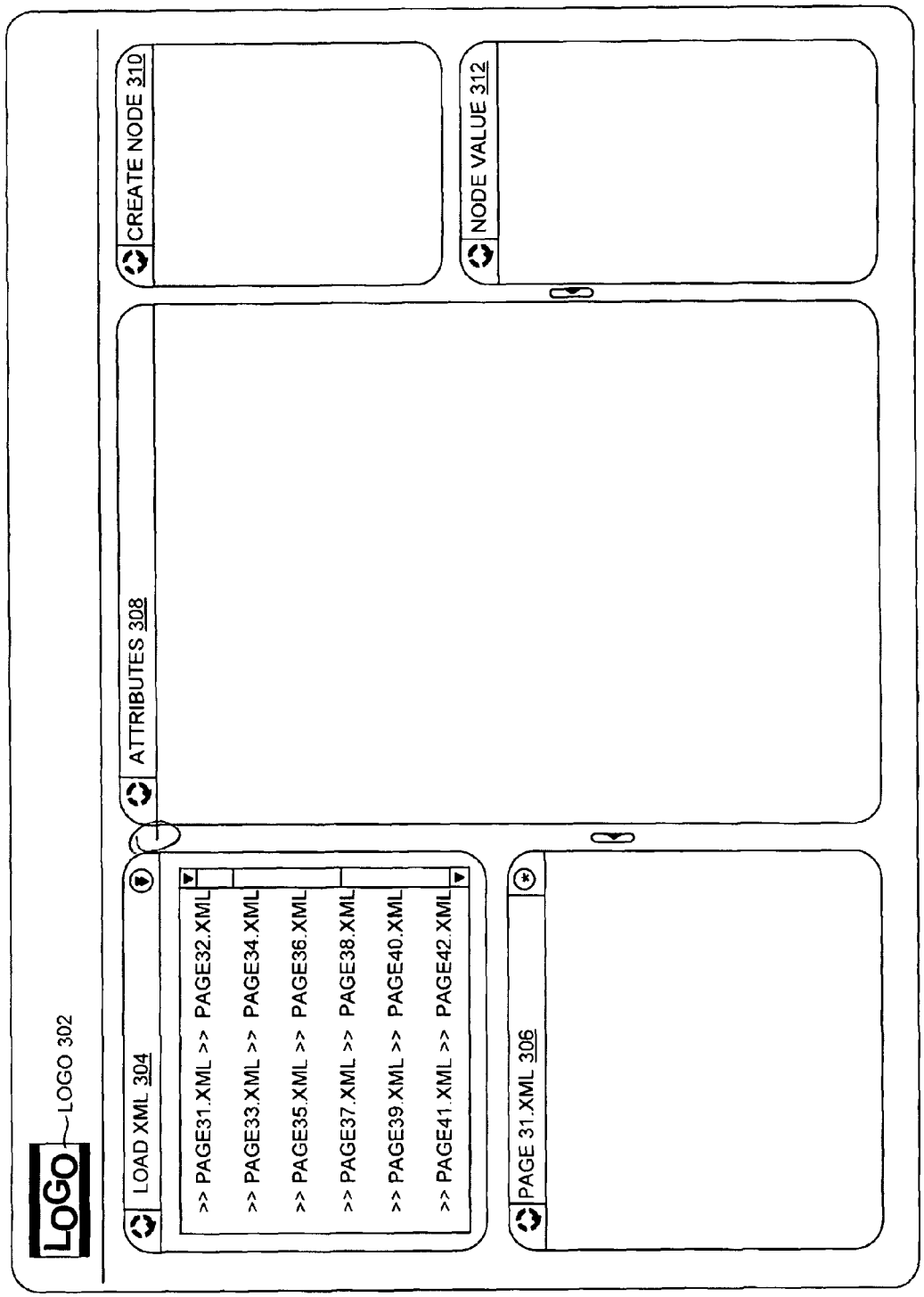
FIG. 3 is a user interface view of the tagging module of FIG. 1, according to one embodiment.

FIG. 3 is a user interface view of the tagging module 106 of FIG. 1, according to one embodiment. Particularly, FIG. 3 illustrates a logo 302, a load XML 304, a page 31.XML 306, an attributes 308, a create node 310 and a node value 312 according to one embodiment. The logo 302 may be a graphical element, symbol and/or an icon set in a unique typeface. The load XML 304 may be a simplified subset of standard generalized markup language that may facilitate a sharing of data across different information systems, particularly systems connected through the network (e.g., internet). The page 31 XML 306 may consist of pages containing various information in XML format. The attribute 308 (e.g., which may be a type of meta-data used to describe a content of the page 31.XML 306) may be a parameter of an element in markup languages (e.g., XML). The create node 310 may be an abstract basic unit building data structure (e.g., such as linked lists, trees, computer-based representations of graphs, nodes containing data and/or links to other nodes). The node value 312 may be included in the meta-data (e.g., the meta-data 410 of FIG. 4) describing the context of the learning object.

In one example embodiment, the meta-data may include the attribute of each of the learning objects, a node of the each of the learning objects, and/or the node value of the learning objects.

Figure 4:
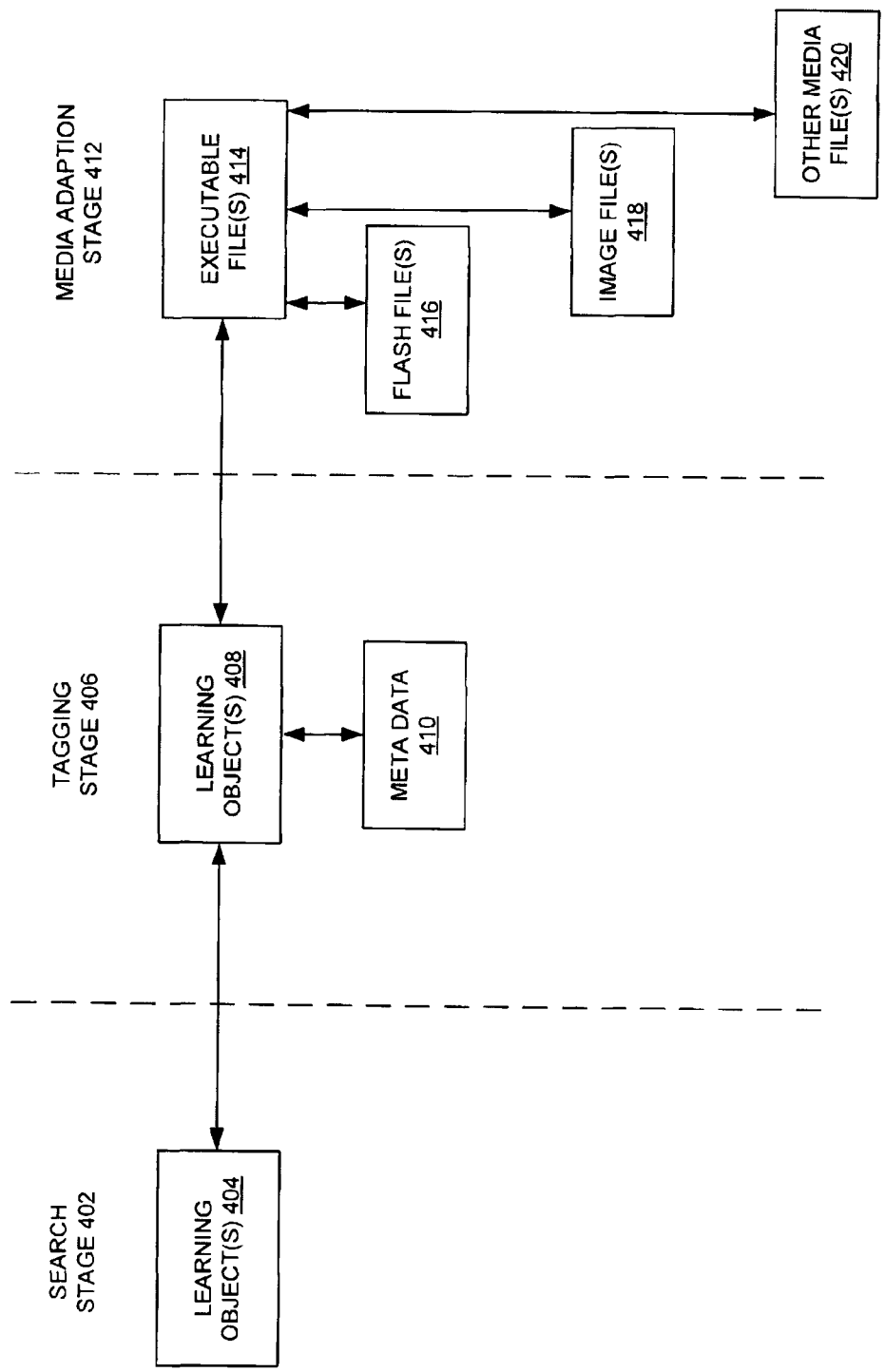
FIG. 4 is a stage view of generating executable files as a part of creating an e-learning process, according to one embodiment.

FIG. 4 is a stage view of generating executable files as a part of creating an e-learning process, according to one embodiment. Particularly, FIG. 4 illustrates a search stage 402, learning objects 404, a tagging stage 406, learning objects 408, a meta-data 410, a media adaptation stage 412, executable files 414, flash files 416, image files 418 and an other media files 420 according to one embodiment. The search stage 402 may include searching for the learning objects in a repository (e.g., local and/or remote) based on a content query data. The learning objects 404 (e.g., which may follow an industry standard for reusable learning objects such as the SCORM) may possess a characteristic of plug-and-play interoperability, accessibility, and/or reusability. The tagging stage 406 may encompass assigning meta-data to the learning objects.

The learning object 408 (e.g., which may be similar to the learning object 404) may be selected through a search based on a particular content query data. The meta-data 410 may describe a context of each of the learning objects 408 such that the learning objects 408 become readily accessible based on a search of the context. The media adaptation stage 412 may contain steps to generate executable files 414 based on the learning objects 408 and auxiliary files associated with the set of executable files to create an e-learning course of the mobile device (e.g., the mobile device 126 of FIG. 1).

The executable files 414 may be based on the learning objects and the auxiliary files to create the e-learning course of a specific media type. The flash files 416 may contain animation programs with full-screen navigation interfaces, graphic illustrations, and/or simple interactivity in an anti-aliased, resizable file format that may be small enough to stream across a normal modem connection. The image files 418 may contain a standardized and/or organized image data which may be used by the mobile device 126. The other media files 420 may be any file apart from the flash files 416 and/or the image files 418 supporting an audio visual format.

In example embodiment as illustrated in FIG. 4, the learning objects 404 of search stage 402 may be collected using content query data. The learning objects 408 of tagging stage 406 may be tagged with the meta-data 410 based on their contexts. The executable files 414 of the media adaptation stage 412 may be associated with the flash files 416, the image files 418 and the other media files 420 of the media adaptation stage 412 to create an e-learning course readily operable in a device (e.g., stationary and/or mobile).

In another example embodiment, learning objects may be searched based on content query data in the repository. The executable files 414 may be generated based on the learning objects 408 and/or the number of auxiliary files associated with the executable files 414 to create an e-learning course of a specific media type. The tagging module 106 of FIG. 1 may assign the meta-data 410 to each of the learning objects 408 to describe contexts of the learning objects 408. A context query data and meta-data of learning objects may be compared to perform a context search to select a subset of the learning object 408 matching the context query data. Also a widget (e.g., which may be a user interface element such as a window and/or a text box) having the subset of the learning object may be rendered to a learning device (e.g., a desk top, a lap top, a PDA, etc.) through processing a demand data (e.g., which considers a time data, a necessity data, a priority data, and other data).

For example, in an e-learning and/or e-training of a sales person (e.g., where a full sales training course may be available through the learning management system), a subset (e.g., "Tip of the day," "Did you know?," "Training hit," etc. based on the policy, interests, and/or goals of a company administering the sales training course) of the full sales training course may be delivered to the sales person using a widget based on a user interface element, such as a window and/or a text box (e.g., to horn skills of the sales person and/or educate the sales person).

The executable module 108 of FIG. 1 may generate the executable files 414 associated with an electronic device that may have the learning objects. The auxiliary creation module 204 of FIG. 2 may create a number of auxiliary files associated with the executable files 414 to support the executable files 414 based on the learning objects 408 with animations, images, and other media types. The number of auxiliary files may include one of the flash files 416, the image files 418 and/or the other media files 420.

Figure 5:
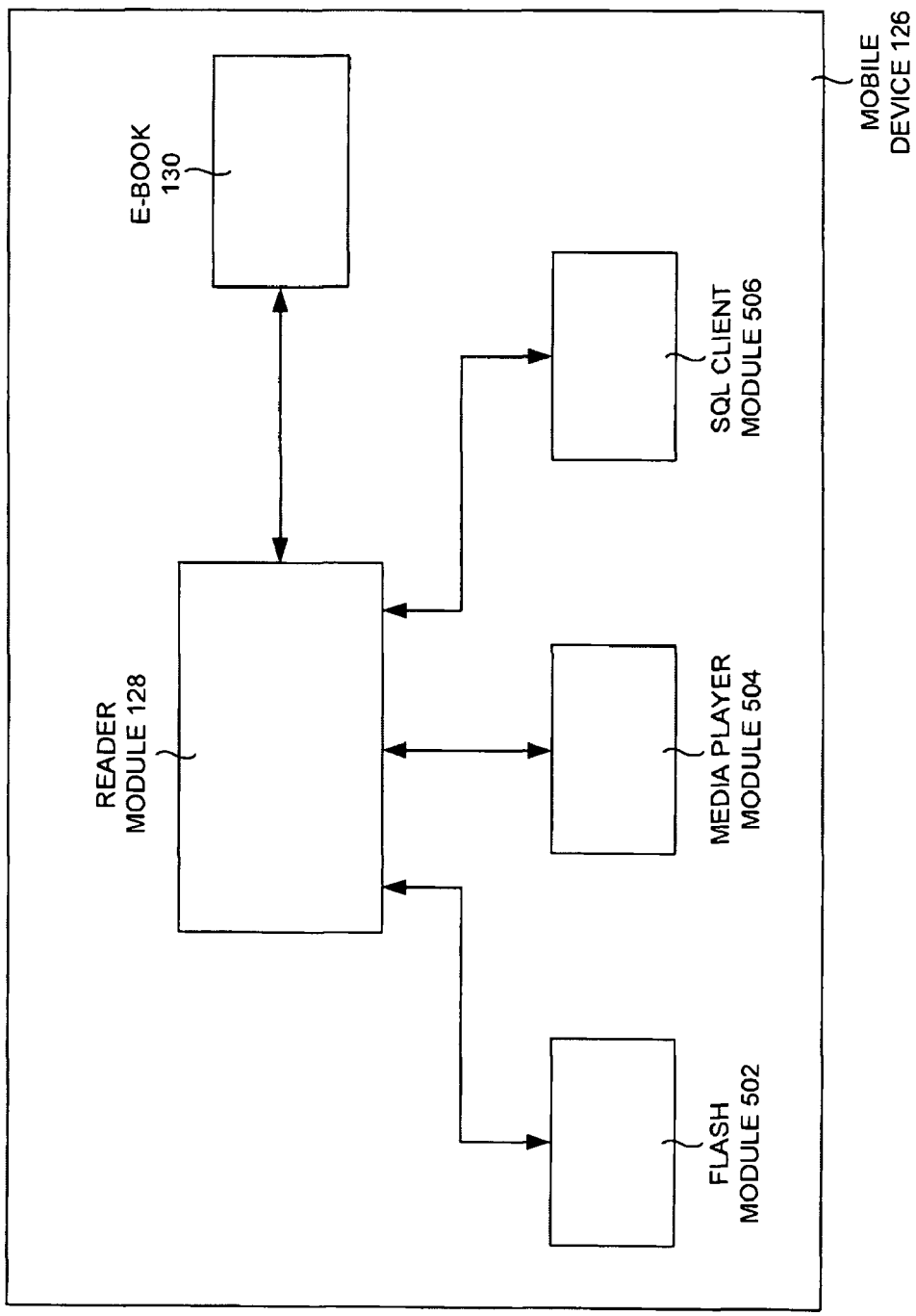
FIG. 5 is an exploded view of the mobile device of FIG. 1, according to one embodiment.

FIG. 5 is an exploded view of the mobile device 126 of FIG. 1, according to one embodiment. Particularly, FIG. 5 illustrates the reader module 128, the e-book 130, a flash module 502, a media player module 504 and a SQL client module 506 according to one embodiment. The reader module 128 of the application program may process the e-book 130 containing the executable file and/or the auxiliary file associated with the executable file. The e-book 130 may enable a user to access (e.g., listen, read, speak, write, etc.) an e-learning course (e.g., in a digital format). The flash module 502 may enable the user to access animation files in the mobile device (e.g., the mobile device 126 of FIG. 1). The media player module 504 may enable the user to play an audio and/or a video file in podcast. The SQL client module 506 may enable the user to have a connection between a SQL server database and the mobile device 126.

In example embodiment as illustrated in FIG. 5, the reader module 128 of the mobile device 126 may interact with the e-book 130, the flash module 502, the media player module 504 and the SQL client module 506 of the mobile device 126

Figure 6:
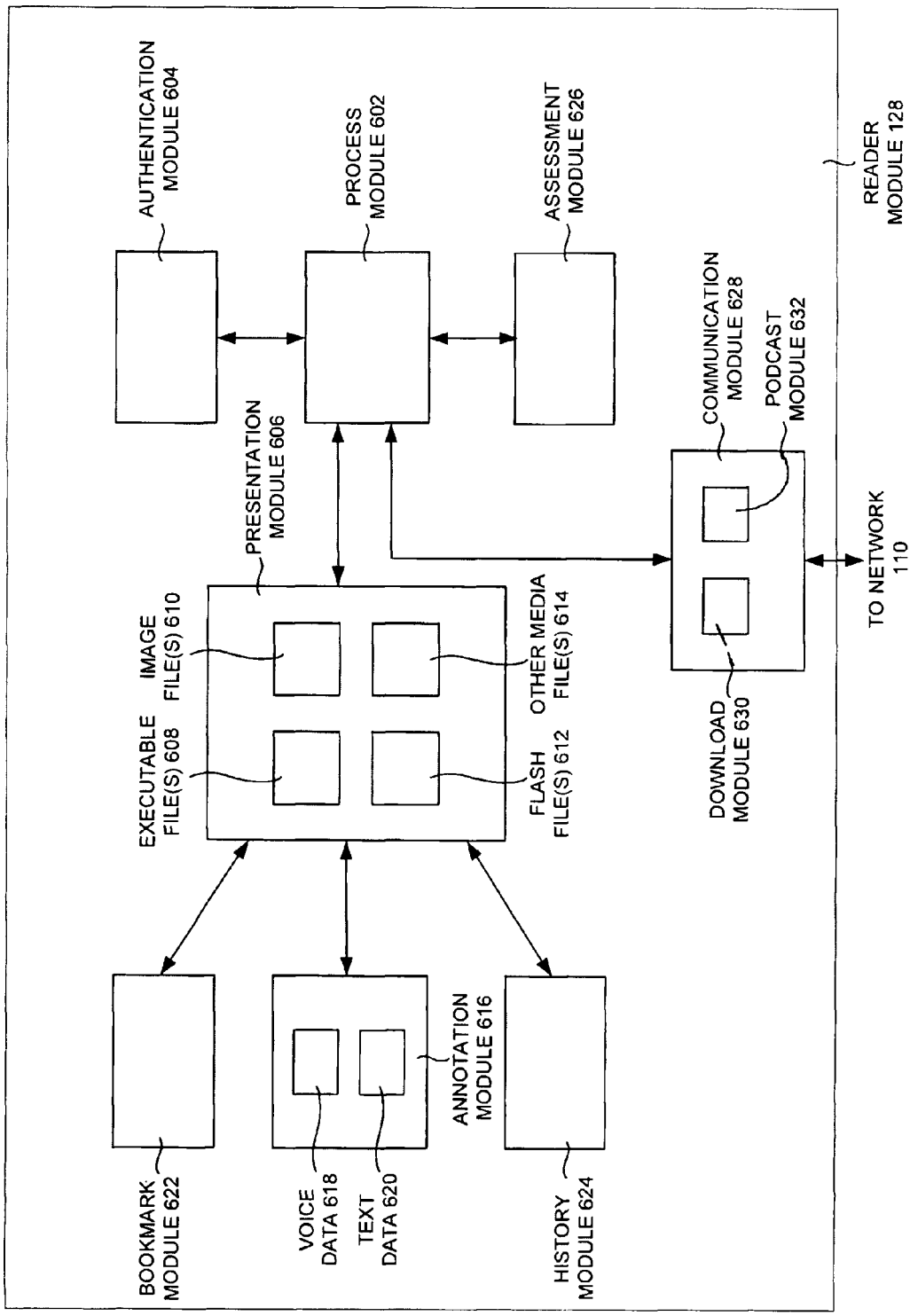
FIG. 6 is an exploded view of the reader module of FIG. 1, according to one embodiment.

FIG. 6 is an exploded view of the reader module 128 of FIG. 1, according to one embodiment. Particularly, FIG. 6 illustrates a process module 602, an authentication module 604, a presentation module 606, executable files 608, image files 610, flash files 612, other media files 614, an annotation module 616, a voice data 618, a text data 620, a bookmark module 622, a history module 624, an assessment module 626, a communication module 628, a download module 630 and a podcast module 632, according to one embodiment. The process module 602 may process an e-learning course based on the executable files in the reader module (e.g., the reader module 128 of FIG. 1) of the mobile device (e.g., the mobile device 126 of FIG. 1).

The authentication module 604 of the reader module (e.g., the reader module 128 of FIG. 1) may verify a user name and/or a password entered by the user. The presentation module 606 may present the executable files 608 and the auxiliary files of the mobile device 126 of FIG. 1 in a particular sequence when processing a signal data associated with a menu of the e-learning course. The executable files 608 may be based on the learning objects and a number of auxiliary files associated with the set of executable files to create the e-learning course of the specific media type. The image files 610 may contain the standardized and/or organized image data in the mobile device.

The flash files 612 may contain animation programs with full-screen navigation interfaces, graphic illustrations, and/or simple interactivity in antialiased, resizable file format that may be small enough to stream across a normal modem connection. The other media files 614 may be any file apart from the flash files (e.g., flash files 612) and/or image files (e.g., image files 610) supporting an audio visual format. The annotation module 616 may provide details, explain and/or clarify the text data 620 and/or the voice data 618 on a particular page of the e-learning course with an input data of the user. The voice data 618 (e.g., which may be comments, notes, etc. of a user) may be used to annotate to a content on the particular page.

The text data 620 (e.g., which may be comments, notes, etc. of the user) may be used to annotate to the content on the particular page. The bookmark module 622 may display a bookmark on each page of the e-book that may enable a direct access to a favorite page of the e-learning course through recording a location of the favorite page of the e-learning course. The history module 624 may track and/or generate a list of pages viewed on each page of the e-learning course. The assessment module 626 may generate an assessment result data through scoring a performance of the user on a test presented to the user.

The communication module 628 may enable communications between a client side content and a host system of an e-learning system. The download module 630 may enable the user to download the application program, the executable files and/or the auxiliary files to the mobile device. The podcast module 632 may enable the user to subscribe to the e-learning course using syndication feeds and/or playbacks on mobile devices and/or personal computers.

In example embodiment as illustrated in FIG. 6, the process module 602 of the reader module 128 may interact with the authentication module 604, the presentation module 606, the assessment module 626 and the communication module 628. The presentation module 606 may interact with the annotation module 616, the bookmark module 622 and the history module 624. The presentation module 606 may include the executable files 608, the image files 610, the flash files 612 and the other media files 614. The annotation module 616 may include the voice data 618 and the text data 620. The communication module may include the download module 630 and the podcast module 632.

In another example embodiment, the executable files 608, flash files 612, and/or image files 610 may be encrypted to prevent an unauthorized user from accessing the e-learning course (e.g., where an assessment file may be a part of the executable files 608). The path creation module 206 of FIG. 2 may generate sequences to present any portion of the executable files and/or the number of auxiliary files (e.g., based on the SCORM standard). The auxiliary creation module 204 of FIG. 2 may create a number of auxiliary files (e.g., which may be the image files 610, the flash files 612, and/or the other media files 614) associated with the executable files 608 to support the executable files 608 based on the learning objects. Also, the executable files 608 and the number of auxiliary files may be selectively streamed and/or downloaded when communicating the e-learning course to the mobile device.

Figure 7:
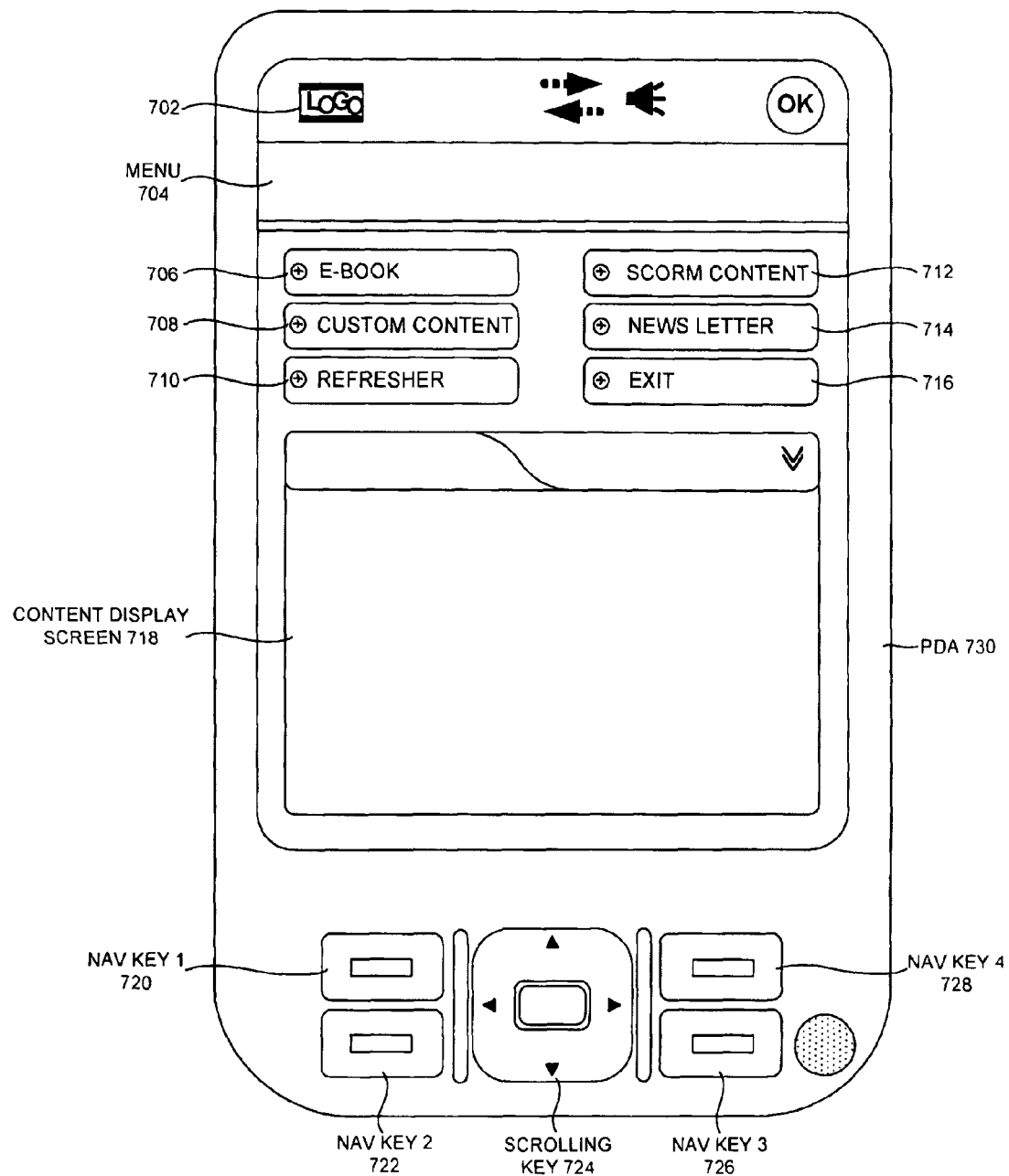
FIG. 7 is a physical view of the mobile device of FIG. 1, according to one embodiment.

FIG. 7 is a physical view of the mobile device of FIG. 1, according to one embodiment. Particularly, FIG. 7 illustrates a logo 702, a menu 704, an e-book link 706, a custom content link 708, a refresher option 710, a SCORM content link 712, a news letter link 714, an exit link 716, a content display screen 718, a nav key 1 720, a nav key 2 722, a scrolling key 724, a nav key 3 726, a nav key 4 728 and a PDA 730. The logo 702 may be a graphical element, symbol and/or an icon set in a unique typeface on the mobile device screen. The menu 704 may display a list of commands presented to the user by the mobile device. The e-book link 706 may enable the user of the mobile device to access an e-learning course in a digital format.

The custom content link 708 may provide the user with user specific content on a particular subject. The refresher option 710 may enable a user to review and/or update the e-learning course. The SCORM content link 712 may enable the user to access a collection of learning objects based on the SCORM standard and specifications. The newsletter link 714 may enable the user to access distributed (e.g., periodically) information (e.g., which may be about a topic that may be of interest to the user). The exit option 716 may terminate an execution of the process and/or performs a clean-up operation of the process.

The content display screen 718 may be a touch screen display that may be provided by taping a screen to activate the buttons and/or the menu choices. The nav key 1-4 720-722 and 726-728 may enable the user to control and/or navigate through the handheld device. The scrolling key 724 may enable the user to slide horizontally and/or vertically presentation of content such as text, drawing and/or images across the content display screen. The PDA 730 may be a handheld mobile device which contains the e-book with the reader module 128 of FIG. 1.

In example embodiment, as illustrated in FIG. 7, the content display screen 718 of the PDA 730 may display the menu associated with the e-learning course. The user may navigate through the menu using the nav keys and/or the scrolling key. The user may connect to view and/or read the e-learning course (e.g., contained in the e-book) through the e-book link 706 and/or through the SCORM content link 712. Also, the user may access regularly distributed information through the newsletter link 714 and/or access a specific content through the custom content link 708.

In another example embodiment, learning objects may be based on the shareable courseware object reference model (SCORM) with plug-and-play interoperability, accessibility and/or reusability (e.g., of the web-based content). A preview of an e-learning course may be presented through executing executable files and/or auxiliary files associated with the executable files according to any number of navigation paths of the e-learning course. The navigation paths may sequentially present the learning objects of the e-learning course according to the SCORM.

Figure 8:
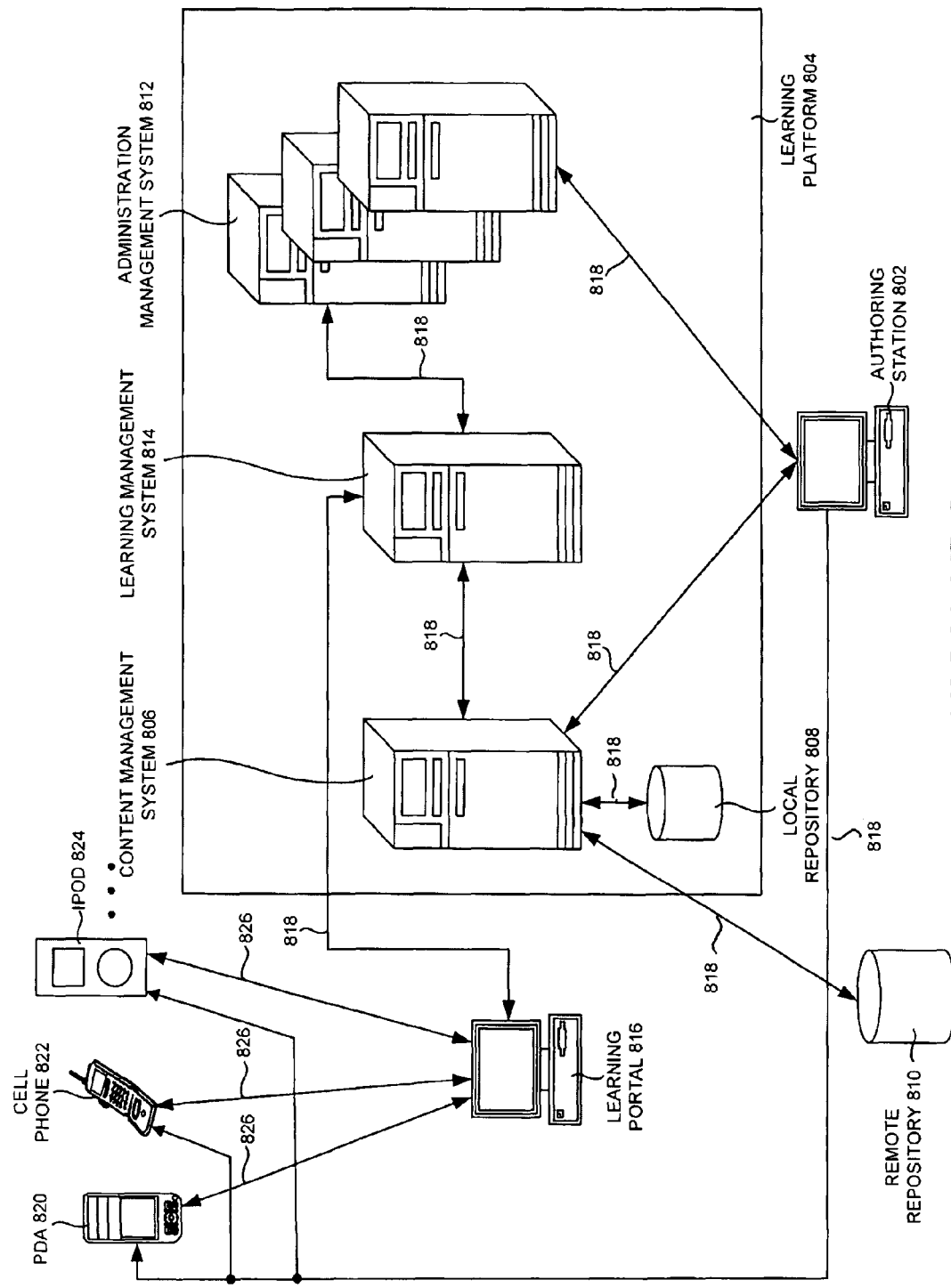
FIG. 8 is a network view of the authoring module of FIG. 1 and the mobile device of FIG. 1 interacting with the learning platform, according to one embodiment.

FIG. 8 is a network view of the authoring module 102 of FIG. 1 and the mobile device 126 of FIG. 1 interacting with the learning platform 112, according to one embodiment. Particularly, FIG. 8 illustrates an authoring station 802, a learning platform 804, a content management system 806, a local repository 808, a remote repository 810, an administration management system 812, a learning management system 814, a learning portal 816, a PDA 820, a cell phone 822 and an iPod® 824 according to one embodiment. The authoring station 802 may interface with the mobile device (e.g., the mobile device 126 of FIG. 1) to replicate the application program and/or the executable files and/or the auxiliary files to the mobile device.

The learning platform 804 may include the content management system 806, the learning management system 814, and the administration management system 812. The content management system 806 may store one or more structural elements associated with a course that may also apply the meta-data describing the context to the learning objects such that the learning objects become readily accessible based on a search of the context. The local repository 808 may be a central place located locally where multiple databases and/or files may be stored, maintained and/or located for distribution over the network (e.g., the network 110 of FIG. 1).

The remote repository 810 may be a central place located remotely where multiple databases and/or files are stored, maintained and/or located for distribution over a network (e.g., the network 110 of FIG. 1). The administration management system 812 may provide a database of a course material including additional information about courses (e.g., a title, a description, and/or a popularity of each course being offered) and/or may also initiate the e-learning course through processing a descriptive data of the e-learning course.

The learning management system 814 may determine structural elements to present to a learner based on a selected learning strategy and/or generate an assessment data to test a user of the structural elements (e.g., such that test results may be used by the learning management system (LMS) to determine a level of the user. The learning portal 816 may enable the user to download and/or carry the e-learning course customized to a need of the user.

A communication link 818 and 826 may be used to communicate (e.g., transmit and/or receive) between one entity and another entity. The PDA 820 may be a handheld mobile device which may be used as a mobile phone, a web browser and/or a portable media player to process an e-learning course. The cell phone 822 may be a long-range, portable electronic device for personal telecommunications over long distance. The iPod® 824 may be a portable media player that stores media on an internal hard drive and/or may also serve as an external data storage device for the e-learning course.

In example embodiment as illustrated in FIG. 8, the authoring station 802 may communicate with the content management system 806 and the administration management system 812 of the learning platform 804 through the communication link 818. The authoring station 802 may also communicate with the PDA 820, the cell phone 822, and the iPod® 824. The content management system 806 may communicate with the local repository 808, the remote repository 810 and communicate with the learning management system 814 through the communication link 818.

The learning management system 814 may communicate with the administration management system 812 and the learning portal 816 through the communication link 818. The learning portal 816 may communicate with the PDA 820, the cell phone 822 and the iPod® 824 through the communication link 826.

In another example embodiment, learning objects may be published (e.g., stored) to the content management system 806 through applying meta-data describing a context to each of the learning objects such that the learning objects become readily accessible based on a search of the context. An e-learning course may be communicated to the content management system 806 which interfaces with a mobile device (e.g., the PDA 820, the cell phone 822, the iPOD® 824, etc.) executing the e-learning course.

In addition, the e-learning course may be initiated through communicating descriptive data of the e-learning course to the administration management system 812. The descriptive data may include a title of the e-learning course, an author of the e-learning course, a description of the e-learning course, a credit of the e-learning course, a prerequisite of the e-learning course, and/or a competency of the user of the e-learning course.

Also, the learning objects may be searched in a repository (e.g., the local repository 808 and/or the remote repository 810) based on the content query data. Furthermore, the e-learning course may be communicated to the specific media type bypassing the content-management system 806. The specific media type may include the computer, the personal digital assistant, the mobile phone, and/or the iPod®.

Figure 9:
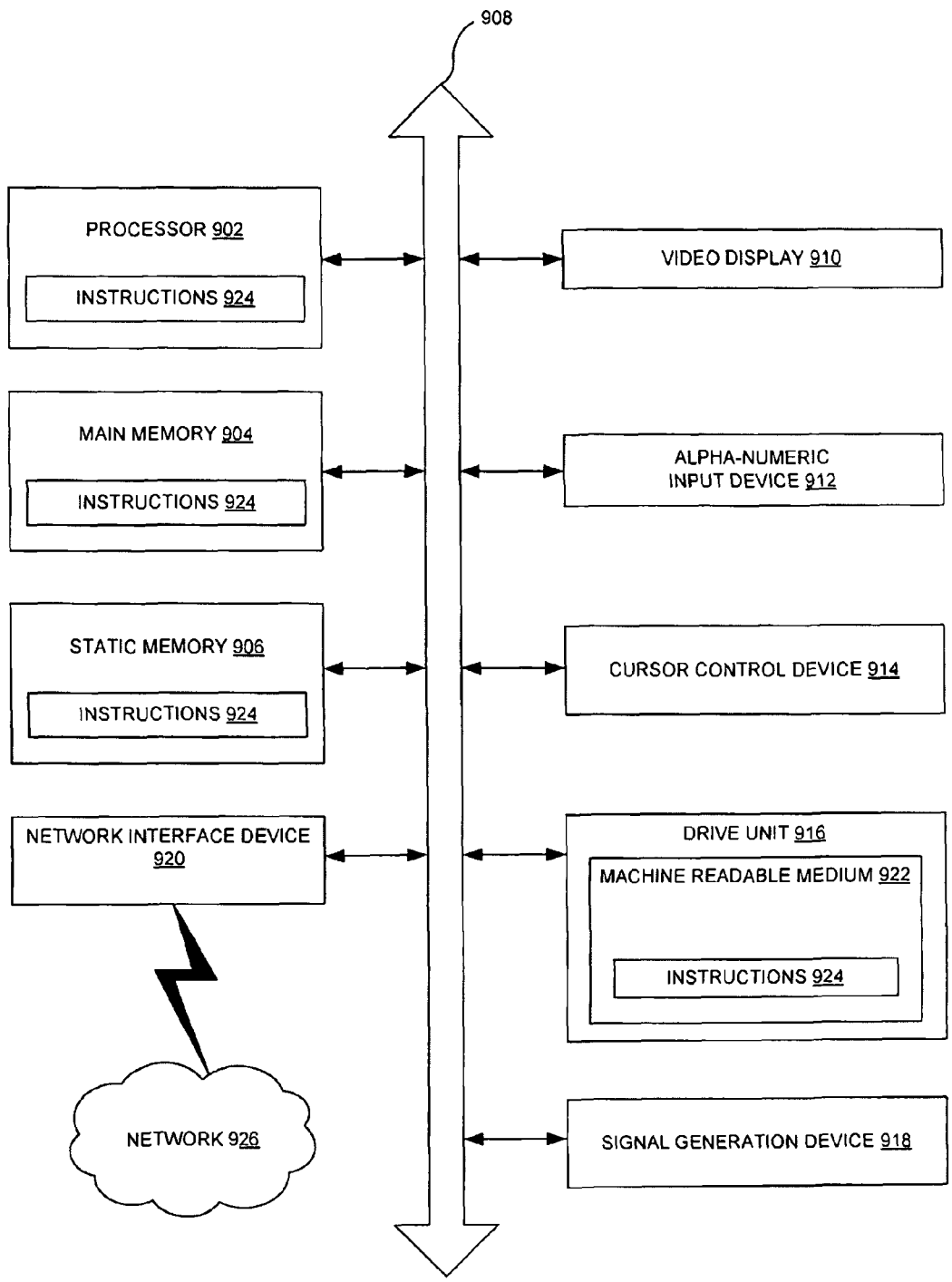
FIG. 9 is a diagrammatic system view of a data processing system in which any of the embodiments disclosed herein may be performed, according to one embodiment.

FIG. 9 is a diagrammatic system view 900 of a data processing system in which any of the embodiments disclosed herein may be performed, according to one embodiment. Particularly, the diagrammatic system view 900 of FIG. 9 illustrates a processor 902, a main memory 904, a static memory 906, a bus 908, a video display 910, an alpha-numeric input device 912, a cursor control device 914, a drive unit 916, a signal generation device 918, a network interface device 920, a machine readable medium 922, instructions 924, and a network 926, according to one embodiment.

The diagrammatic system view 900 may indicate a personal computer and/or a data processing system in which one or more operations disclosed herein are performed. The processor 902 may be microprocessor, a state machine, an application specific integrated circuit, a field programmable gate array, etc. (e.g., Intel® Pentium® processor). The main memory 904 may be a dynamic random access memory and/or a primary memory of a computer system. The static memory 906 may be a hard drive, a flash drive, and/or other memory information associated with the data processing system.

The bus 908 may be an interconnection between various circuits and/or structures of the data processing system. The video display 910 may provide graphical representation of information on the data processing system. The alpha-numeric input device 912 may be a keypad, keyboard and/or any other input device of text (e.g., a special device to aid the physically handicapped). The cursor control device 914 may be a pointing device such as a mouse.

The drive unit 916 may be a hard drive, a storage system, and/or other longer term storage subsystem. The signal generation device 918 may be a bios and/or a functional operating system of the data processing system. The network interface device 920 may be a device that may perform interface functions such as code conversion, protocol conversion and/or buffering required for communication to and from a network (e.g., the network 110 of FIG. 1). The machine readable medium 922 may provide instructions on which any of the methods disclosed herein may be performed. The instructions 924 may provide source code and/or data code to the processor 902 to enable any one/or more operations disclosed herein.

Figure 10:
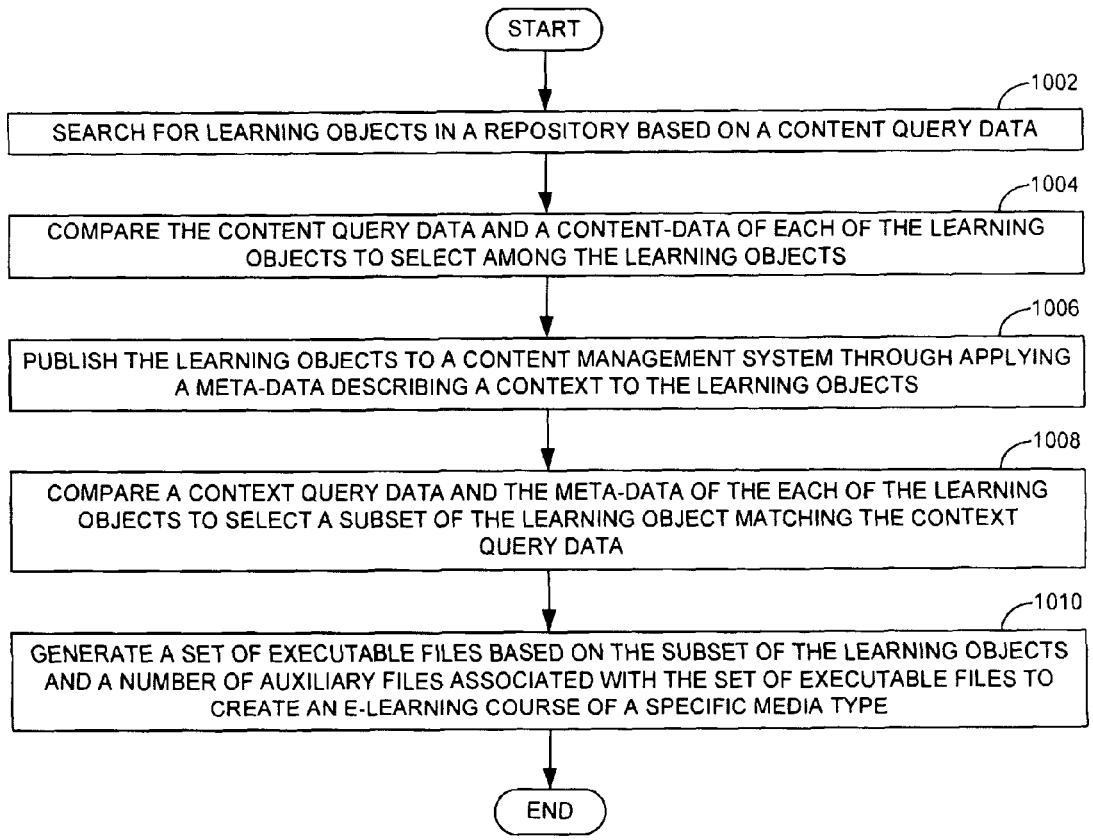
FIG. 10 is a process flow chart of creating an e-learning course of a specific media type, according to one embodiment.

FIG. 10 is a process flow chart of creating the e-learning course of a media type, according to one embodiment. In operation 1002, the learning object may be searched in a repository based on the content query data. In operation 1004, the content query data and the content data of each of the learning object may be compared to select among the learning objects. In operation 1006, the learning objects may be published to a content management system through applying the meta-data (e.g., the meta-data 410 of FIG. 4) describing the context to the learning objects.

In operation 1008, the context query data may be compared with the meta-data (e.g., the meta-data 410 of FIG. 4) of the each of the learning objects to select a subset of the learning object matching the context query data. In operation 1010, the set of the executable files may be generated based on the subset of the learning objects and the number of auxiliary files associated with the set of executable files to create an e-learning course of the specific media type.

Figure 11:
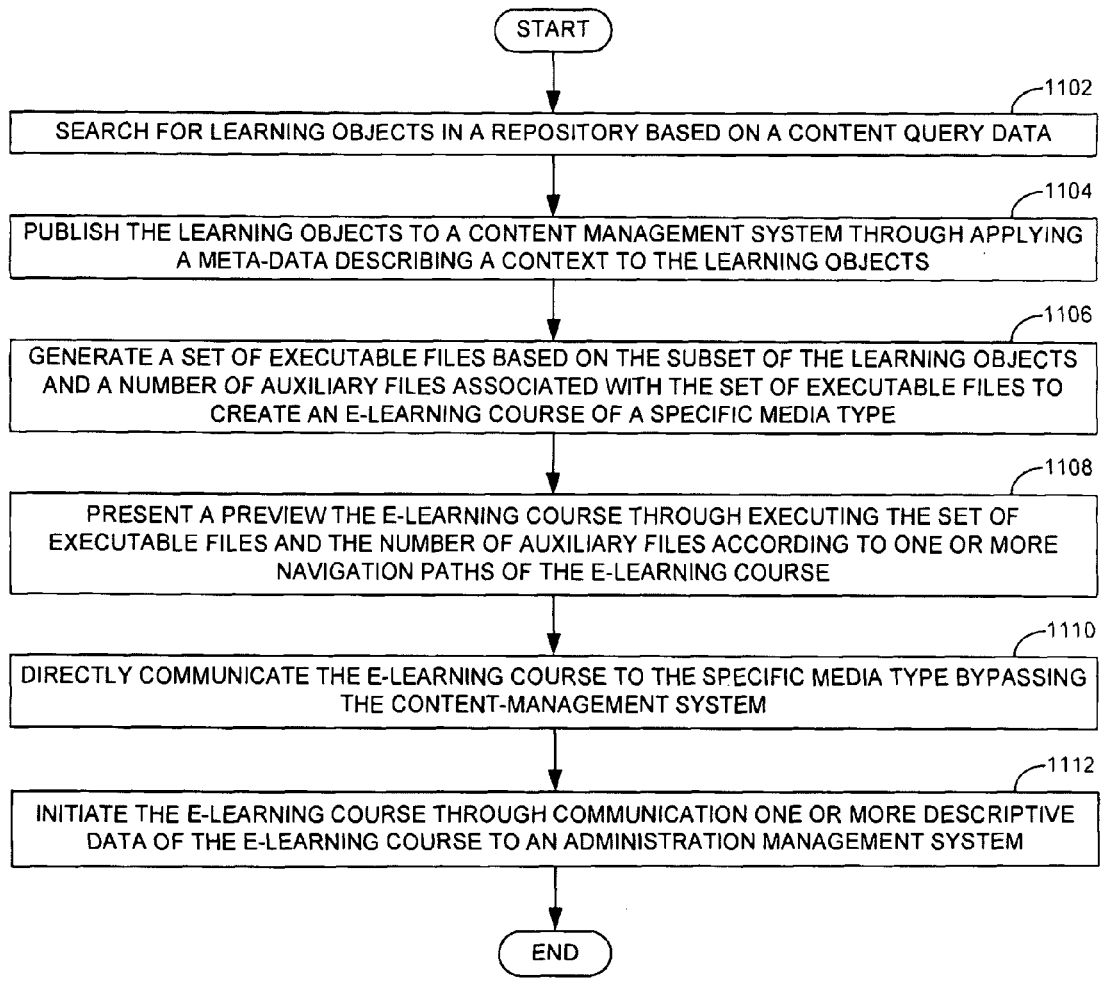
FIG. 11 is a process flow chart of generating a set of executable files based on the subset of the learning objects, according to one embodiment.

FIG. 11 is a process flow chart of generating a set of executable files based on the subset of the learning objects, according to one embodiment. In operation 1102, the learning objects in a repository may be searched based on the content query data. In operation 1104, the learning objects may be published to the content management system through applying the meta-data describing a context to the learning objects. In operation 1106, the set of executable files may be generated based on the subset of the learning objects and the number of auxiliary files associated with the set of executable files to create the e-learning course of a specific media type.

In operation 1108, a preview of the e-learning course may be presented through executing the set of executable files and/or the number of auxiliary files according to the one or more navigation paths of the e-learning course. In operation 1110, the e-learning course may be directly communicated to the specific media type bypassing the content management system. In operation 1112, the e-learning course may be initiated through communication one or more descriptive data of the e-learning course to an administration management system.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example the authoring module 102, the course creation module 104, the tagging module 106, the executable module 108, the content management module 114, a learning management module 116, the administration management module 118, and/or the reader module 128 of FIG. 1, the search module 202, the auxiliary creation module 204, the path creation module 206, and/or the course preview module 208 of FIG. 2, the flash module 502, the media player module 504 and/or the SQL client module 506 of FIG. 5, the process module 602, the authentication module 604, the presentation module 606, the annotation module 616, the bookmark module 622, the history module 624, the assessment module 626, the communication module 628, the download module 630, and/or the podcast module 632 of FIG. 6 and/or other modules may be embodied through an authoring circuit, a course creation circuit, a tagging circuit, an executable circuit, a content management circuit, a learning management circuit, an administration circuit, a reader circuit, a search circuit, an auxiliary creation circuit, a path creation circuit, a course preview circuit, a flash circuit, a media player circuit and a SQL client circuit, a process circuit, an authentication circuit, a presentation circuit, an annotation circuit, a bookmark circuit, a history circuit, an assessment circuit, a communication circuit, a download circuit, a podcast circuit and/or other circuits using one or more of the technologies described herein In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:

searching for a plurality of learning objects in a repository based on a content query data using a processor;

assigning a meta-data to each of the plurality of learning objects with the meta-data describing a context of the each of the plurality of learning objects, through a tagging module of an authoring module, wherein the meta-data is assigned based on a Shareable Courseware Object Reference Model (SCORM) standard;

publishing the plurality of learning objects to a content management system through applying the meta-data describing a context to each of the plurality of learning objects to such that the plurality of learning objects become readily accessible based on a search of the context;

generating a set of executable files based on the plurality of learning objects and a number of auxiliary files associated with the set of executable files adapting to a specific media type to create an e-learning course of a media type, wherein the number of auxiliary files are configured to support the executable files based on the plurality of learning objects with an animation, an image, and other media type though an auxiliary creation module of the authoring module, wherein the number of auxiliary files to include at least one of a flash file, an image file, and a media file;

communicating the e-learning course to the content management system which interfaces with a mobile device executing the e-learning course;

performing at least one of selectively streaming the set of executable files and the number of auxiliary files and selectively downloading the set of executable files and the number of auxiliary files when communicating the e-learning course to a memory of the mobile device;

providing a database of the e-learning course material including additional information about the e-learning courses;

providing a learning platform in the mobile device to deliver and support learning by organizing, mapping and delivering curriculum activity;

initiating the e-learning course through communicating at least one descriptive data of the e-learning course to an administration management system, wherein the at least one descriptive data comprising at least a title of the e-learning course, an author of the e-learning course, a description of the e-learning course, a credit of the e-learning course, a prerequisite of the e-learning course, and a competency of a user subscribing to the e-learning course, wherein the plurality of learning objects are based on the SCORM which enables a plug-and-play interoperability, an accessibility, and a reusability of a web-based content and wherein the meta-data to include at least an attribute of the each of the plurality of learning objects, a node of the each of the plurality of learning objects, and a node value of the each of the plurality of learning objects, wherein the number of auxiliary files to include at least one of a flash file, an image file, and a media file;

determining a plurality of sequences to present any portion of the set of executable files and the number of auxiliary files according to the SCORM standard through a path creation module of the authoring module;

comparing the content query data and a content-data of the each of the plurality of learning objects to select among the plurality of learning objects, wherein a search based on the content-data is performed using a search engine processing and interpreting the each of the plurality of learning objects in a markup language format, wherein a markup language to include at least one of a hypertext markup language (HTML), a standard generalized markup language (SGML), and an extensible markup language (XML);

comparing a context query data and the meta-data of the each of the plurality of learning objects to perform a context search which is used to select a subset of the plurality of learning object matching the context query data;

rendering a widget having the subset of the plurality of learning object to a learning device through processing a demand data of the learning device, wherein the widget is a user interface element and the demand data considers at least one of a time data, a necessity data, a priority data, and other data of a user of the learning device;

encrypting the set of executable files, a number of flash files and the image files to prevent an unauthorized user from accessing the e-learning course;

presenting a preview of the e-learning course through executing the set of executable files and the number of auxiliary files according to at least one navigation path of the e-learning course, wherein the at least one navigation path to sequentially present the plurality of learning objects of the e-learning course according to the SCORM;

directly communicating the e-learning course to the media type bypassing the content-management system, wherein the media type to include at least one of a computer, a personal digital assistant, a mobile phone, and an iPod;

creating a run-time environment of the e-learning course according to the SCORM standard when communicating the e-learning course to at least one of the content management module and a particular media type;

providing an appropriate media player module adapted to the mobile device to play a media content in the e-learning course;

providing a direct access to a book marked page of the e-learning course when there is request for display of the bookmarked page of the e-learning course;

managing and tracking activity associated with the e-learning courses in the mobile device through a learning management module;

generating at least one assessment file of the e-learning course, wherein the at least one assessment file to be a part of the set of executable files; and sharing a common training management database and permanent historical training record of a user through an administration module of the learning management module.

* * * * *